(No Model.)

E. SOLVAY.
APPARATUS FOR THE DISTILLATION OF HYDROCHLORIC ACID.

No. 503,557. Patented Aug. 15, 1893.

WITNESSES:
W. H. Randall,
H. E. Chase,

INVENTOR
Ernest Solvay
BY
Hey Wilkinson Fowler
ATTORNEYS.

UNITED STATES PATENT OFFICE.

ERNEST SOLVAY, OF BRUSSELS, BELGIUM, ASSIGNOR TO THE SOLVAY PROCESS COMPANY, OF SYRACUSE, NEW YORK.

APPARATUS FOR THE DISTILLATION OF HYDROCHLORIC ACID.

SPECIFICATION forming part of Letters Patent No. 503,557, dated August 15, 1893.

Application filed November 10, 1890. Serial No. 370,864. (No model.) Patented in Belgium September 17, 1889, No. 87,749; in England October 3, 1889, No. 15,531, and in France December 17, 1889, No. 202,662.

*To all whom it may concern:*

Be it known that I, ERNEST SOLVAY, a citizen of Belgium, residing at Brussels, Belgium, have invented new and useful Improvements in an Apparatus for the Distillation of Hydrochloric Acid, (for which I have obtained patents in Belgium, No. 87,749, of September 17, 1889; in Great Britain, No. 15,531, of October 3,1889, and in France, No. 202,662, of December 17, 1889,) of which the following, taken in connection with the accompanying drawings, is a full, clear, and exact description.

My invention relates to an improved apparatus for distilling hydrochloric acid and carrying out the process set forth in my pending application, Serial No. 348,293, filed April 17, 1890; and to this end it consists, essentially, in a distilling receptacle for receiving the hydrochloric acid, an evaporating receptacle for the dehydrating material, a heat generator for heating said evaporating receptacle and concentrating said dehydrating material, and separate connecting passages between the distilling and the evaporating receptacle for deducting the dehydrating material from the evaporating to the distilling receptacle and vice versa.

The invention also consists in the detail construction and arrangement of its parts, all as hereinafter more particularly described and pointed out in the claims.

In describing this invention, reference is had to the accompanying drawings, forming a part thereof, in which, like letters and figures indicate corresponding parts in both views.

Figure 1:
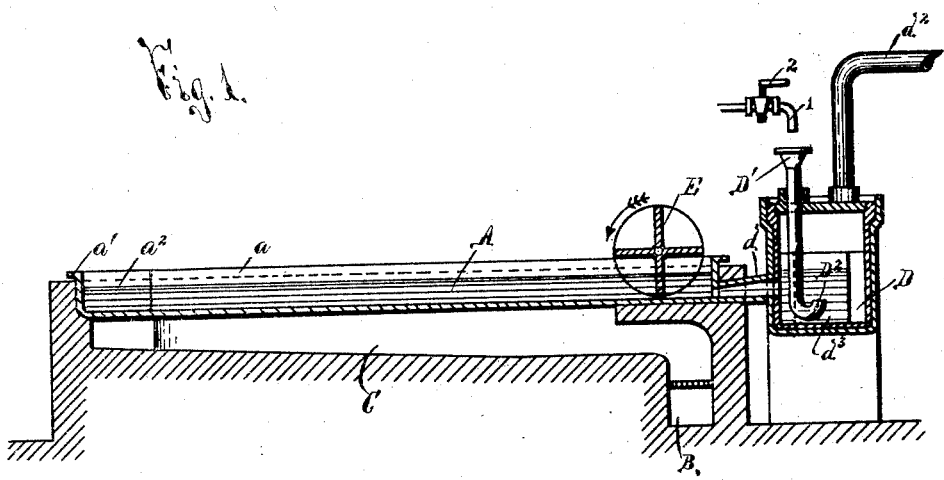
Figure 2:
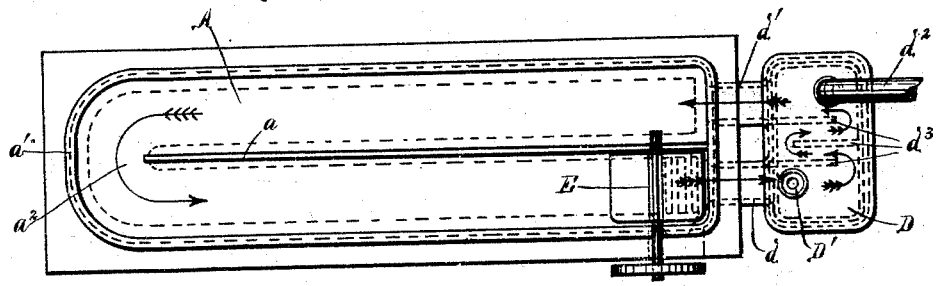

Figure 1 represents a longitudinal vertical section of my improved apparatus, and Fig. 2 represents a top plan view of the parts as illustrated in Fig. 1.

It is frequently necessary in the chemical industry to separate hydrochloric acid in its dry and gaseous condition from its commercial solution. It has long been known that pure and simple distillation is not suitable for this purpose, and that it is necessary to employ a dehydrating material and sulphuric acid or chloride of calcium have been so used.

It is equally well known that a hydrochloric acid distilling apparatus is very disagreeable to manage and successfully operate, since, after the exit of the hydrochloric acid gas, it is necessary to conduct the dehydrating material, as sulphuric acid or chloride of calcium into an evaporating apparatus for the purpose of concentrating the dehydrating material, which becomes diluted in the distillation of the hydrochloric acid gas. Moreover, it is only possible to slightly concentrate the diluted dehydrating material as the remaining chlorides in the evaporating apparatus would cause great embarrassment if too great a degree of concentration was effected, and it is therefore necessary to handle considerable quantities of the dehydrating material, which, from their nature and temperature, are not easily handled; and to effect only the desired degree of concentration.

My improved apparatus is especially designed to effect the desired result easily and with great convenience, practicability and effectiveness.

—A— represents an evaporating receptacle, here illustrated as composed of an open oblong chamber formed into two compartments by a partition —a—, which, in order to establish a connection —$a^2$— between the two compartments, does not extend entirely to the end —$a'$— of the evaporating chamber.

The heat generator —B— is of a suitable kind, form or size, and is operated to produce heat, which, by means of flues or other means —C— of suitable construction is utilized to heat the receptacle —A—, and thus concentrate the dehydrating material.

—D— is a distilling apparatus connected by the inlet and outlet pipes —d— and —$d'$— to the separate compartments of the evaporating chamber for conducting the dehydrating material from the evaporating to the distilling chamber for distilling the hydrochloric acid and returning the dilute dehydrating material to the evaporating chamber for concentration.

Hydrochloric acid is conducted within the chamber —D— by an inlet pipe —$D'$— to which the hydrochloric acid is conveyed from any suitable reservoir, not illustrated, by a suitable pipe —1— having any desirable construction of valve —2—. This chamber —D— is closed and provided with a suitable outlet pipe —$d^2$— for conducting the liberated hydrochloric acid gas to any desired locality.

The entire apparatus is filled with sulphuric acid or with a concentrated solution of calcium chloride, and, when brought to a sufficient temperature, a continuous stream of liquid hydrochloric acid is, by means of a suitable inlet pipe —D'— introduced within the distilling receptacle.

As preferably constructed the inlet pipe —D'— is so formed that its lower inlet extremity —$D^2$— is near the base of the distilling receptacle in proximity to the inlet opening for the dehydrating material and below the top level of the material within the receptacle —D—. Immediately upon the entrance of the hydrochloric acid the dehydrating material liberates the hydrochloric acid gas, and thereby becomes diluted. In order that the dilute material may be withdrawn and concentrated material added to attack the incoming hydrochloric acid I force the dehydrating material in a continuous circuit by means of a paddle or other suitable propeller —E— movable within the evaporating receptacle. It will thus be seen that the movement of the propeller produces a circulation within the evaporating chamber and effects the desired result, thus continually furnishing concentrated dehydrating material to the distilling apparatus, and preventing undue concentration of said dehydrating material. The flow of this dehydrating material is shown by arrows upon Fig. 2, and, in order to produce the best results, the evaporating chamber is sufficiently large that but a slow movement of the material within the same is desired for affording the necessary concentration and distillation.

To avoid too quick mixing in the distiller and to prevent loss of acid or calcium chloride I introduce in a distilling receptable several baffle plates —$d^3$— for compelling the dehydrating material and hydrochloric acid to flow therethrough in a winding circuit. This result is further augmented by, as previously described, admitting the hydrochloric acid into the distilling apparatus at substantially the same point as the dehydrating material, and by withdrawing the gas from an opposite portion of the distilling receptacle.

In some cases it is desirable that air be present at the distillation of the gas, and in this event I frequently prefer to use the same as an injector, and effect the motive for compelling the current of dehydrating material.

The liberated hydrochloric acid gas is conducted by the pipes —$d^2$— into a suitable condensing apparatus, and are then condensed with pure water, thus producing a chemically pure product.

By my improved process I entirely obviate the pumping of heated liquid and acid by distilling the acid in a horizontal apparatus, and require but a minimum amount of fuel, since the excess of dehydrating material may be as large as desired without materially increasing the labor.

The operation of my invention will be readily perceived from the foregoing description and upon reference to the drawings.

Having thus fully described my invention, what I claim as new, and desire to secure by Letters Patent, is—

1. The combination of a distilling apparatus for receiving the acid to be distilled and the dehydrating material for attacking the acid, an evaporating receptacle for said dehydrating material composed of greater horizontal area than the distilling apparatus, a heat generator for heating the evaporating receptacle concentrating the dehydrating material, and connecting passages between the distilling and evaporating receptacles for conducting the dehydrating material from one to the other, a pipe for conducting the acid to the distilling apparatus, and a pipe for conducting the distilled gas from said distilling apparatus, substantially as set forth.

2. The combination of a distilling apparatus for receiving the acid to be distilled and the dehydrating material for attacking the acid, an evaporating receptacle for the dehydrating material, a heat generator for heating said evaporating receptacle and concentrating said dehydrating material, separate connecting passages between the distilling apparatus and the evaporating receptacle for conducting the dehydrating material from the evaporating receptacle to the distilling apparatus and vice versa, a pipe for conducting the acid to the distilling apparatus, and a pipe for conducting the distilled gas from said distilling apparatus and means, substantially as described, for effecting the flow of said dehydrating material, substantially as and for the purpose specified.

3. The combination of a distilling apparatus for receiving the acid to be distilled and the dehydrating material for attacking the acid, an evaporating receptacle for the dehydrating material, a heat generator for heating said evaporating receptacle and concentrating said dehydrating material, separate connecting passages between the distilling apparatus and the evaporating receptacle for conducting the dehydrating material from the evaporating receptacle to the distilling receptacle and vice versa, a pipe for conducting the acid to the distilling apparatus, and a distilled-gas outlet-pipe opening from the distilling apparatus at a point in proximity to the point from which the outlet pipe for the dehydrating material opens from said distilling apparatus, substantially as described.

4. In an apparatus for distilling hydrochloric acid, the combination of a distilling apparatus for receiving the acid to be distilled, an evaporating receptacle for concentrating the dehydrating material, separate connecting passages between the distilling apparatus and the evaporating receptacle for conducting the dehydrating material from the evaporating receptacle to the distilling apparatus and vice versa, an acid inlet pipe for the distilling apparatus having its opening in proximity to the discharge opening of the inlet passage for conducting the dehydrating material within said distilling apparatus, an outlet for the distilled acid gas, and means for effecting the flow of said dehydrating material through said evaporating receptacle and the distilling apparatus, substantially as described.

In testimony whereof I have hereunto signed my name, in the presence of two attesting witnesses, at the city of Brussels, Belgium, this 30th day of August, 1890.

ERNEST SOLVAY.

Witnesses:
R. LUCION,
GREGORY PHELAN.